5 # United States Patent Office 3,373,167
Patented Mar. 12, 1968

3,373,167
PREPARATION OF ALPHA-BETA-
UNSATURATED SULFONES
James L. Dever and Ivan C. Popoff, Ambler, Pa., assignors to Pennsalt Chemicals Corporation, Philadelphia, Pa., a corporation of Pennsylvania
No Drawing. Filed July 28, 1964, Ser. No. 385,797
13 Claims. (Cl. 260—289)

ABSTRACT OF THE DISCLOSURE

A process for preparing vinyl sulfones by reacting in an inert organic solvent at a temperature between about −10° C. and about 30° C. a sulfonyl methylphosphinyl carbanion with an essentially stoichiometric amount of an aldehyde or ketone.

---

There are numerous methods for preparing alpha-beta-unsaturated sulfones, but all previous methods suffer from one or more undesirable features. For example, the reaction between an organic mercaptan and an epoxide can be used to give a thioether, which may be subsequently oxidized to a sulfone, and the hydroxyalkyl sulfone converted to an alpha-beta-unsaturated sulfone. The process suffers in that it is not capable of producing a wide variety of unsaturated sulfones because it is limited by the relatively small number of epoxides commercially available. Furthermore, this prior art method is dependent upon oxidation and dehydration steps under rather drastic conditions and in some cases such drastic conditions may be expected to degrade the very product that is being made.

Another prior art method used for the preparation of alpha-beta-unsaturated sulfones is the reaction between an aldehyde and an alkyl sulfonyl acetic acid. Here again the method is limited by the availability of the alkyl sulfonyl acetic acids, which compounds also have the disadvantage of not being especially stable and are prone to lose $CO_2$ on warming. This prior art method also generally results in a poor yield of product, rarely exceeding 30% and usually between 10 and 20%.

There is also disclosed in the literature a method for preparing alpha-beta-unsaturated sulfides from a carbonyl compound and a thiomethyl-phosphonate. M. Green, in the Journal of the Chemical Society, 1963, p. 1324, discloses the reaction between an aldehyde and an alkylthiomethyl-phosphonate in the presence of a strong base to yield the alkyl vinyl thioether, but the method requires that both the aldehyde and the alkylthiomethylphosphonate contact the strong base simultaneously. Thus, the procedure is limited to the choice of those aldehydes which are not attacked by the base, and the author himself recognizes this limitation and admits that the process is seriously limited for synthetic purposes. In addition, this procedure is not entirely suitable for the preparation of sulfones. Although one might expect that the sulfides that are obtained by Green's process could, in turn, be oxidized to the corresponding sulfones, the agents employed for the oxidation (e.g., hydrogen peroxide, organic peroxide, permanganate, etc.) would very likely cause epoxidation or oxidative degradation of the double bond before or with oxidation of the sulfide sulfur so that any sulfone would be obtained in extremely small yield. This is supported by the disclosure of U.S. 2,163,180 which discusses such oxidations and points out the need to carry out the reaction under closely controlled conditions of acidity, temperature, and oxidant concentration. Thus the procedure is not a generally suitable technique for obtaining alpha-beta-unsaturated sulfones.

It is an object of this invention to provide a method for the preparation of alpha-beta-unsaturated sulfones from commercially available materials in a manner which enables an extremely large variety of such sulfones to be prepared.

Another object of the invention is to provide alpha-beta-unsaturated sulfones in exceptionally high yield by a simple, straight-forward process having high efficiency.

A still further object of the invention is to provide alpha-beta-unsaturated sulfones in which the double bond may be either terminal or internal.

It is a still further object of the invention to provide vinyl sulfones under mild conditions of reaction without significant side reactions or unwanted by-products being formed.

These and other objects of the invention are achieved by the process comprising the preparation in an inert solvent and at a temperature between about −10° and about 30° C., of a sulfonylmethylphosphinyl carbanion and thereafter contacting the intermediate anion with a carbonyl compound selected from the group of aldehydes and ketones. The process may be illustrated by the following reactions where the sulfonylmethylphosphinyl carbanion is derived from a phosphonate:

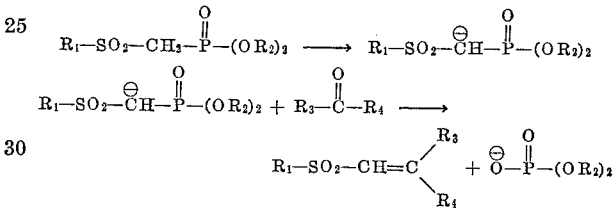

It is to be understood that the sulfonylmethylphosphinyl carbanion may be derived from any number of phosphinyl derivatives, as for example, phosphonates, phosphine oxides, and phosphinates. Thus the sulfonylmethylphosphinyl compound which is converted to the carbanion by the above reaction will have the structure

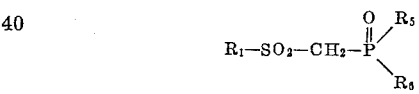

where $R_1$ is defined below and $R_5$ is a member selected from the group consisting of lower alkyl (preferably containing up to six carbon atoms), phenyl, lower alkoxy (up to six carbon atoms), phenoxy, or the like. The preferred sulfonylmethylphosphinyl compound will be a sulfinylmethylphosphonate and much of the description of the invention which follows will use such phosphonates as illustrative of the invention.

The preparation of the anion intermediate is achieved by reaction of the sulfonylmethylphosphinyl product with a base stronger than sodium hydroxide. Thus, operable bases will include the alkali metals, alkali metal alcoholates, alkali metal alkyls and aryls, and the like. These bases will include sodium, potassium, lithium, sodium hydride, lithium hydride, sodium methylate, sodium ethylate, potassium butylate, phenyl lthium, butyl lithium, etc.

The sulfonylmethylphosphonate reactant [i.e.,

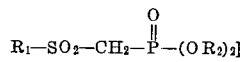]

may be any alkyl-, aryl- or heterocyclicsulfonylmethyl-phosphonate. $R_1$ is limited only to the extent that any functional group it contains may not be reactive with the strong base. Preferably, $R_1$ is selected from the group consisting of hydrocarbon alkyl and aryl radicals containing from one to eighteen carbon atoms.

The $R_2$ group of the sulfonylmethylphosphonate is likewise unlimited except as is $R_1$, but because the $R_2$ group is converted in the reaction to a by-product, it will be preferable to use starting compounds where $R_2$ is a simple group (e.g. methyl, ethyl, phenyl, etc.) and in this way the cost of the process is even further reduced. The starting sulfonylmethylphosphonates are readily made by reaction of a mercaptan with a commercially available chloromethylphosphonate and subsequent oxidation of the sulfide to sulfone e.g.,

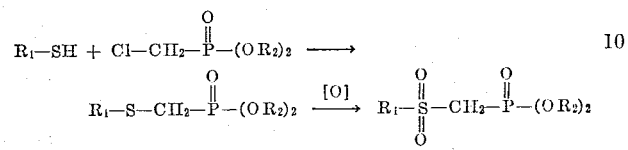

Illustrative phosphinyl compounds which may be used in the process of this invention will include diethyl ethylsulfonylmethylphosphonate, diethyl butylsulfonylmethylphosphonate, dimethyl phenylsulfonylmethylphosphonate, diisopropyl propylsulfonylmethylphosphonate, diphenyl hexylsulfonylmethylphosphonate, dimethyl dodecylsulfonylmethylphosphonate, diethyl dodecylsulfonylmethylphosphonate, dimethyl octadecylsulfonylmethylphosphonate, dimethyl phenylsulfonylmethylphosphonate, dimethyl tolylsulfonylmethylphosphonate, dimethyl naphthylsulfonylmethylphosphonate, diethyl (α-thienylsulfonyl)methylphosphonate, diethyl (γ-pyridylsulfonyl)methylphosphonate, diethyl (α-pyridylsulfonyl)methylphosphonate, diethyl phenylsulfonylmethylphosphonate, diphenyl(phenylsulfonylmethyl)phosphine oxide, diphenyl(ethylsulfonylmethyl)phosphine oxide, ethyl ethylsulfonylmethyl(phenyl)phosphinate, ethyl [(α-thienylsulfonyl)methyl]phenylphosphinate, and the like.

It is evident that because an extremely large selection of mercaptans is available for recation with, for example, the chloromethylphosphonate, that the starting material (e.g., the sulfonylmethylphosphonate) is virtually unlimited. Examples of starting mercaptans will include: methanethiol, ethanethiol, propanethiol, 2-propanthiol, butanethiol, tert-butanethiol, 2-butanethiol, octanethiol, 2-octanethiol, benzenethiol, p-methylbenzenethiol, α-napthalenethiol, β-naphthalenethiol, 2-pyridinethiol, 3-pyridinethiol, 4-pyridinethiol, 1-thiophenethiol, 2-thiophenethiol, p-cyanobenzenethiol, p-chlorobenzenethiol, p-dimethylaminobenzenethiol, 2-m-xylenethiol, cyclohexanethiol, phenylmethanethiol, etc.

The aldehyde and ketone which is used in the reaction may also be chosen from a wide range of compounds. Any aldehyde or ketone is operable but to obtain the high yields that the invention provides, aldehydes and ketones will be used which are free of any substituent reactive with the base employed. Reactive groups to be avoided include hydroxyl, amino, carboxyl, mercapto (SH), bromo, and the like. Preferably, the carbonyl compound will be one of structure $R_3C(O)R_4$ where $R_3$ is a member selected from the group of hydrogen, alkyl and aryl groups containing from one to eighteen carbon atoms and $R_4$ is selected from the group of alkyl, aryl and heterocyclic groups containing one to eighteen carbon atoms and $R_3$ and $R_4$ together may form a ring. Examples of useful aldehydes and ketones follow:

A. Saturated aliphatic, substituted and unsibstituted
  Propionaldehyde
  Hexaldehyde
  Decylaldehdye
  3-methylmercaptopropionaldehyde
  γ-Cyano-α,α-dimethylbutyraldehyde
  2,3-dimethoxypropanal
  5-methoxypentanal
  3-methoxybutyraldehyde
  Stearaldehyde
  2-phenylpropionaldehyde
  Chloral B. Unsaturated aldehydes, substituted and unsubstituted
  α-Amylcinnamaldehyde
  Acrolein
  4-dimethylaminocinnamaldehyde
  2,4-hexadienal
  o-Nitrocinnamaldehyde
  Phenylpropargylaldehyde
  3-(α-Thienyl)acrolein C. Cyclic aldehydes
  Cyclohexanecarboxaldehyde
  Tricyclodecamethanal
  1,2,3,6-tetrahydrobenzaldehyde D. Aromatic, substituted and unsubstituted aldehydes
  p-Acetamidobenzaldehyde
  9-anthraldehyde
  4-bromobenzaldehyde
  2-carbethoxybenzaldehyde
  3-chlorobenzaldehyde
  5-chloro-2-nitrobenzaldehyde
  4-cyanobenzaldehyde
  3,4-dichlorobenzaldehyde
  2,5-dimethoxybenzaldehyde
  3,4,5-trimethoxybenzaldehyde
  3,5-dimethoxybenzaldehyde
  2,4-dinitrobenzaldehyde
  4-ethoxy-3-methoxybenzaldehyde
  3-fluorobenzaldehyde
  Mesitaldehyde
  2-naphthaldehyde
  Phenanthrene-9-aldehyde
  Terephthaldicarboxaldehyde E. Heterocyclic aldehydes
  Furfural
  Thiophene-2-carboxaldehyde
  5-methoxymethylfurfural
  Quinoline-2-carboxaldehyde
  6-methylpyridine-2-carboxaldehyde
  N-methylpyrrole-2-carboxaldehyde
  2,3, and 4 pyridinecarboxaldehydes Ketones:
  Cyclohexanone
  o-Chloroacetophenone
  Hexafluoroacetone
  Biacetyl
  3-methylbutanone-2
  Cyclohexene-2-one-1

It is also to be understood that polyfunctional mercaptans may be used to react with the chloromethylphosphonate and polyfunctional carbonyl compounds may be reacted with the sulfonylmethylphosphonate. Thus, for example, the following reactions may be carried out with difunctional reagents:

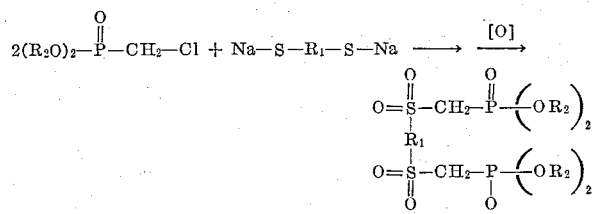

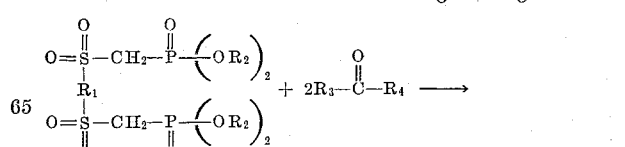

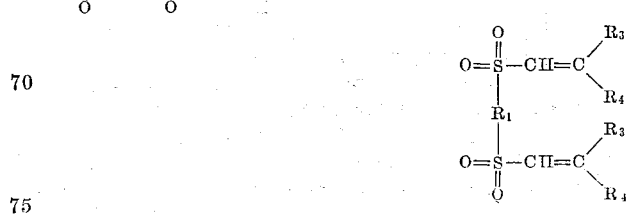

It will also be understood that the above reaction may be carried out stepwise, using one mole of the carbonyl compound so as to obtain a compound of structure:

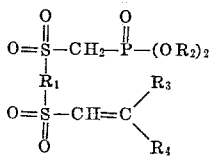

Alternatively, a polyfunctional mercaptan and a polyfunctional carbonyl compound may both be used in the same reaction sequence to yield polymers or, under conditions of high dilution, cyclic compounds; viz:

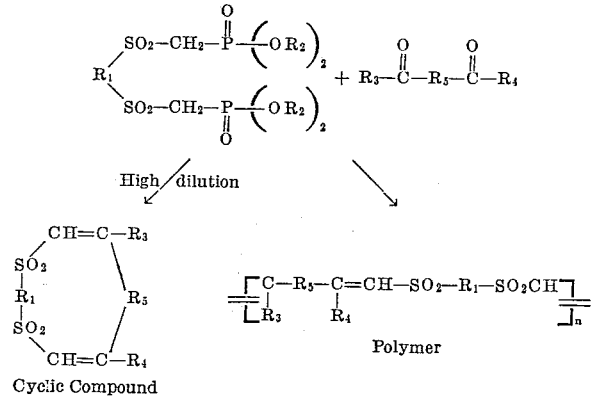

Cyclic Compound

Examples of bifunctional mercaptans which may be converted to the sulfonylmethylphosphonates include alkylene dimercaptans such as:

1,2-ethanedithiol
1,2-propanedithiol
1,3-propanedithiol
1,4-butanedithiol
1,3-butanedithiol
1,2-hex-5-enedithiol
α,α'-p-Xylenedithiol
α,α'-m-Xylenedithiol
p-Mercaptomethylbenzenethiol
m-Benzenedithiol
2,3-quinoxolinedithiol
1,5-naphthalenedithiol
p,p'-Dimercaptodiphenylether
2,5-dimercaptofuran
2,6-dimercaptopyridine Examples of dialdehydes and diketones include:

Glyoxal
Succinaldehyde
Benzil
Terephthalaldehyde
Phthalaldehyde
1,4-cyclohexanedione
1,2-cyclohexanedione
β-Ketobutyraldehyde
2,5-hexanedione (acetonylacetone)
Hexanedial (Adipaldehyde)
Glutaconaldehyde
2,3-naphthalinedicarboxaldehyde
Glutaraldehyde
Octanedial
Heptanedial (pimaldehyde)
1,8-naphthalenedicarboxaldehyde
3,5-pyridinedicarboxaldehyde
Isophthaldehyde The conditions under which the reaction of the invention is carried out are relatively mild and offer no difficulties in procedure. In the first step where the sulfonylmethylphosphonate is reacted with a base stronger than sodium hydroxide the intermediate salt is preferably prepared and used in situ, but since the salt is stable it may be isolated, stored and used when desired. In the first step of the reaction, an inert solvent is used which will contain the basic agent, preferably butyl lithium, phenyl lithium, a sodium alkylate, or a sodium dispersion. Formation of the sulfonylmethylphosphonate anion is only slightly exothermic and the reaction is preferably carried out at room temperature although temperatures ranging from −10 to 30° C. or even higher are quite satisfactory. The inert solvent in which the reaction is carried out may be selected from any of the numerous such solvents available and will include aliphatic and aromatic common solvents. Benzene, toluene, xylene, hexane, cyclohexane, petroleum ether and the like are all useful. Also useful are ethers, and polyethers, both aliphatic and heterocyclic. Examples of such solvents are diethylether, tetrahydrofuran, dioxane, and the like.

After the sulfonylmethylphosphonate ion is formed, the second step of the reaction is carried out simply by adding the carbonyl compound. The reaction with the carbonyl reactant is more exothermic than the first step and occasionally, cooling is required to control the reaction. The reaction temperatures for the second step will also be controlled to a range within −10 to 30° C.

As the reaction proceeds the by-product precipitates from the solvent system and is readily removed by filtration, decantation of the liquid or other well known techniques. Purification of product is also accomplished by the standard procedures of crystallization, distillation, and the like.

The following examples will further serve to illustrate the invention.

*Example 1.—Ethyl 2-phenylvinylsulfone*

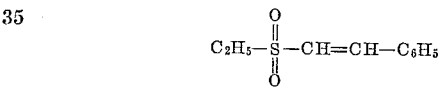

A 500 ml. reaction flask was charged with 10 g. of 53.5% sodium hydride dispersion in oil. This was washed with two 175 ml. portions of petroleum ether to remove the oil. Then, 175 ml. of 1,2-dimethoxyethane was added as solvent and this was followed by the dropwise addition of 49.9 g. (0.2 mole) of diethyl ethylsulfonylmethylphosphonate in 50 ml. of 1,2-dimethoxyethane. The addition was made in 0.25 hour at 25–31° C. The salt precipitated out as a white solid. The mixture was stirred at room temperature for 0.5 hour and an additional 75 ml. of solvent were added to facilitate stirring.

To the above mixture was added 23.3 g. (0.22 mole) of freshly distilled benzaldehyde in 30 ml. of 1,2-dimethoxyethane solvent. The addition was made in 0.33 hour at 25–34° C., using cooling as required. As the addition proceeded, the thick white solid thinned out rapidly. The mixture became almost clear and then the gummy tan phosphate by-product began to precipitate. After stirring for 0.4 hour, the clear liquid phase was separated by decantation. The solvent was removed at reduced pressure and on cooling and adding petroleum ether, the residue solidified to give 38.3 g. (97.5% conversion) of crude yellow solid, M.P. 60–63° C. Crystallization from petroleum ether-benzene and diethyl ether yielded 32.5 g. of white solid melting at 65.5–67° C. and representing an 85% conversion. The reported melting point for the product is 66–67° C.

*Example 2.—Ethyl 2-(2-furyl)vinyl sulfone*

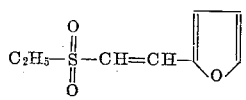

The procedure was the same as in Example 1, using the following reactants:

Sodium hydride—15 g. of 53.5% dispersion

Diethyl ethylsulfonylmethylphosphonate—81.4 g. (0.33 mole)
Furfural—32.0 g. (0.33 mole)

After separation of the clear liquid phase, the solvent was removed at reduced pressure and the residue distilled to give 49.7 g. (80% conversion) of product, B.P. 114–116.5° C., $n_D^{25}$ 1.5614. On standing the distillate solidified. The product was recrystallized from diethylether to yield light tan crystals, M.P. 55.5–56.5° C.

Calculated for $C_8H_{10}O_3S$: C, 51.54; H, 5.42; S, 17.23. Found: C, 51.61; H, 5.54; S, 16.81.

*Example 3.—1-ethylsulfonyl-4(methylmercapto) butene-1*

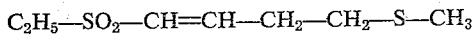
$C_2H_5—SO_2—CH=CH—CH_2—CH_2—S—CH_3$

The procedure was the same as in Example 1 using the following reactants:

Sodium hydride—10.8 g. of 53.5% dispersion
Diethyl ethylsulfonylmethylphosphonate—57.6 g. (0.24 mole)
3-methylmercaptopropionaldehyde—25.0 g. (0.24 mole)

After separation of the clear liquid phase, the solvent was removed at reduced pressure and the residue distilled to yield 34.7 g. (74.5% conversion) of colorless product, B.P. 120–122° C. (0.05 mm.). This was redistilled to give an analytical sample, B.P. 119–120° C. (0.05 mm.), $n_D^{25}$ 1.5219.

Calculated for $C_7H_{14}O_2S_2$: C, 43.29; H, 7.25; S, 32.99. Found: C, 43.57; H, 7.43; S, 32.38.

*Example 4.—1-ethylsulfonyl-3,3,3-trichloropropene-1*

$C_2H_5—SO_2—CH=CH—CCl_3$

The procedure was the same as in Example 1, using the following reactants:

Sodium hydride—11.2 g. of 53.5% dispersion
Diethyl ethylsulfonylmethylphosphonate—61.1 g. (0.25 mole)
Chloral—36.9 g. (0.25 mole)

After separation of the clear liquid phase and removed of the solvent at reduced pressure the residue solidified to yield 56.5 g. (95% conversion) of off-white crude product. This was crystallized from diethyl ether to give 45 g. (76% conversion) of white product. An analytical sample was obtained by distillation, B.P. 96–97° (0.1 mm.), M.P. 53.5–55° C.

Calculated for $C_5H_7Cl_3O_2S$: C, 25.35; H, 2.97; Cl, 44.88; S, 13.51. Found: C, 25.62; H, 3.25; Cl, 44.49; S, 13.60.

*Example 5.—Butyl propenyl sulfone*

$C_4H_9—SO_2—CH=CH—CH_3$

The procedure was the same as in Example 4 using the following reactants:

Sodium hydride—11.2 g. of 53.5% dispersion
Diethyl butylsulfonylmethylphosphonate—69.1 g. (0.25 mole)
Acetaldehyde—11.0 g. (0.25 mole) in 200 cc. 1,2-dimethoxyethane The crude product obtained in quantitative yield was a liquid boiling at 110–130° C. at 2.5 mm. and containing the cis- and the trans- isomer.

*Example 6.—Ethyl 2-(2-pyridyl)vinyl sulfone*
$C_2H_5—SO_2—CH=CH—C_5H_4N$

The procedure was the same as in Example 1 using the following reactants:

Sodium hydride—13.5 g. of 53.3% dispersion
Diethyl ethylsulfonylethylphosphonate—73.3 g. (0.3 mole)
Pyridine 2-carboxaldehyde—32.1 g. (0.3 mole)

After separation of the clear liquid phase, the solvent was removed at reduced pressure and the residue distilled to yield 41.4 g. (70% conversion) of product, B.P. 144–145° C. (0.08 mm). Redistillation gave an analytical sample. B.P. 137–138° C. (0.05 mm.), M.P. 51–53° C.

Calculated for $C_9H_{11}NO_2S$: C, 54.91; H, 5.61; S, 16.25. Found: C, 54.69; H, 6.10; S, 16.24.

*Example 7.—1-(ethylsulfonyl)-2,3-diphenyl-3-oxopropene-1*

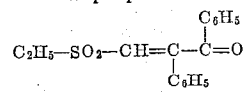

The procedure was the same as in Example 1 using the following reactants:

Sodium hydride—11 g. of 53% (0.25 mole)
Diethyl ethylsulfonylmethylphosphonate—61.1 g. (0.25 mole)
Benzil—52.6 g. (0.25 mole)

When addition was complete, the solvent was removed at reduced pressure to give a white solid residue. This was stirred for one hour in 250 ml. of water. The by-product dissolved and the product was separated by filtration to yield 60.4 g. (80.5% conversion) of white solid, M.P. 134.5–136° C. An analytical sample, M.P. 134–135° C., was obtained by crystallization of a portion of the product from diethyl ether-benzene.

Calculated for $C_{17}H_{16}O_3S$: C, 68.05; H, 5.36; S, 10.68. Found: C, 68.40; H, 5.50; S, 10.52.

*Example 8.—1,4-Bis(ethylsulfonyl)-2,3-diphenylbutadiene-1,3*

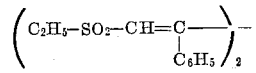

The procedure was as in Example 1 using the following reactants:

Sodium hydride—11 g. of 53% (0.25 mole)
Diethyl ethylsulfonylmethylphosphonate—61.1 g. (0.25 mole)
Benzil—26.3 g. (0.125 mole)
Benzene—350 ml.

When addition was complete, the mixture was heated at reflux for 24 hours. The solvent was then removed at reduced pressure to give a white solid residue. This was stirred in 300 ml. of water for 1.2 hours. The by-product dissolved and the product was separated by filtration.

*Example 9.—4-acetamido-β-ethylsulfonylstyrene*

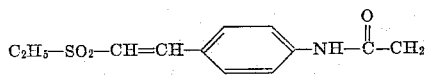

The sodium salt of diethyl ethylsulfonylmethylphosphonate was prepared by using 61.1 g. (0.25 mole) of the sulfonylmethylphosphonate and 11.3 g. of 75% NaH dispersion in 500 ml. of anhydrous ether. To this was added 40.8 g. (0.25 mole) of p-acetamidobenzaldehyde. The reaction mixture was stirred overnight and was filtered and the filtrate discarded. The filter cake was stirred in 500 ml. of water for one hour to remove the by-product. The undissolved material was separated by filtration and recrystallized from acetone to give 60.5 g. (95.5% conversion) of fine, pale yellow crystals, M.P. 203–204° C.

Calculated for $C_{12}H_{15}NO_3S$: C, 56.97; H, 5.96; N, 5.51; S, 12.65. Found: C, 57.23; H, 5.71; N, 5.37; S, 12.38.

*Example 10.—3,4-dichloro-β-ethylsulfonylstyrene*

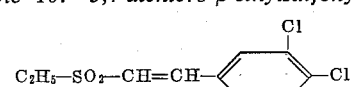

The sodium salt of diethyl ethylsulfonyl methylphosphonate was prepared in 500 ml. of ether from 61.1 g. (0.25 mole) of the phosphonate and 11.3 g. of 53% NaH. Then 43.8 g. (0.25 mole) of 3,4-dichlorobenzaldehyde was added portionwise keeping the temperature below 35°

C. The mixture was refluxed 1 hr. to dissolve the by-product. Filtration gave 60.3 g. (91% conversion) of white produt, M.P. 117.5–118.5° C. A portion was recrystallized from acetone to give white needles of the same melting point.

Calculated for C$_{10}$H$_{10}$Cl$_2$O$_2$S: C, 45.37; H, 3.80; Cl, 26.73; S, 12.09. Found: C, 45.73; H, 3.95; Cl, 26.56; S, 12.41.

*Example 11.—Ethyl 2-(2-thienyl)vinyl sulfone*

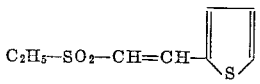

The sodium salt of diethyl ethylsulfonylmethylphosphonate was prepared from 73.3 g. (0.3 mole) of the phosphonate and 13.8 g. (0.3 mole) of 52% NaH in 500 ml. of ether. Then 33.6 g. (0.3 mole) of freshly distilled thiophene-2-carboxaldehyde was added in 0.5 hour keeping the temperature below 35° C. The ethereal solution was separated by decantation, washed with two 200 ml. portions of water, dried with MgSO$_4$, filtered, and the solvent removed to give 49.4 g. of off-white solid product. The ether insoluble material was dissolved in water and extracted with ether. Evaporation gave another 7.1 g. of product. The conversion was 93%. The analytical sample, M.P. 46.5–48.5° C., was obtained by recrystallization from diethyl ether-petroleum ether.

Calculated for C$_8$H$_{10}$O$_2$S: C, 47.50; H, 4.97; S, 31.95. Found: C, 47.75; H, 5.13; S, 31.69.

*Example 12.—Ethyl 2-(2-quinolyl)vinyl sulfone*

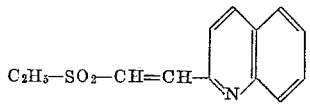

The sodium salt of diethyl ethylsulfonylmethylphosphonate was prepared from 26.7 g. (0.109 mole) of the sulfonyl phosphonate and 5.1 g. of 52% NaH in 250 ml. of ether. To this was added portionwise 17.2 g. (0.109 mole) of quinoline 2-carboxaldehyde keeping the temperature below 30° C. this mixture was then filtered. The ethereal solution yielded 9 g. of tan solid product. The filter cake was washed with water to yield another 11.8 g. of product. The analytical sample, M.P. 84–85° C., was obtained from two recrystallizations from benzene-ethyl ether.

Calculated for C$_{13}$H$_{13}$NO$_2$S: C, 63.18; H, 5.31; N, 5.66; S, 12.99. Found: C, 63.55; H, 5.55; N, 5.77; S, 13.02.

*Example 13.—Ethyl 2-(3-pyridyl)vinyl sulfone*

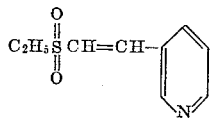

The sodium salt of diethyl ethylsulfonylmethylphosphonate was prepared from 73.3 g. (0.3 mole) of the sulfonylmethylphosphonate and 13.8 g. of 52%NaH in 600 ml. of toluene. Then 32.1 g. (0.3 mole) of pyridine 3-carboxaldehyde was added dropwise in 0.5 hr., keeping the temperature below 35° C. After stirring for 0.5 hr., the clear supernatant was separated by decantation. A small amount of fine white needles, with M.P. 79–80° C., separated. The bulk of the product was obtained from the supernatant as an off-white solid residue. The total conversion was 89%. A sample was recrystallized from ethyl ether-benzene to give fine, white needles, M.P. 79–80° C.

Calculated for C$_9$H$_{11}$NO$_2$S: C, 54.82; H, 5.60; N, 7.09; S, 16.26. Found: C, 55.19; H, 5.85; N, 7.13; S, 16.32.

*Example 14.—Ethyl 2-(N-methyl-2-pyrrolyl)-vinyl sulfone*

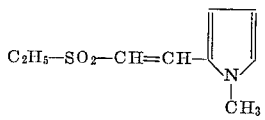

The sodium salt of diethyl ethylsulfonylmethylphosphonate was prepared from 73.3 g. (0.3 mole) of the sulfonylmethylphosphonate and 13.9 g. of 52% NaH in 600 ml. of toluene. Then 32.4 g. (0.3 mole) of N-methylpyrrole-2-carboxaldehyde was added dropwise without indication of reaction. After stirring at room temperature for one hour the temperature had risen to 34° C. The mixture was heated at 75–85° C. for 1.0 hour. The clear supernatant was separated by decantation and the solvent removed at reduced presure to give 53.5 g. (90% conversion) of tan solid. One recrystallization from ether-benzene gave fine needles, M.P. 69.5–71° C.

Calculated for C$_9$H$_{13}$NO$_2$S: C, 54.25; H, 6.58; N, 7.02; S, 16.10. Found: C, 54.58; H, 6.86; N, 7.22; S, 16.16.

*Example 15.—2-thienyl heptenyl sulfone*

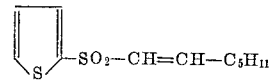

The procedure is the same as in Example 1 using the following reactants:

Sodium hydride—15 g. at 53.5% dispersion
Diphenyl[(2 - thienylsulfonyl)methyl]phosphine oxide—120.0 g. (0.33 mole)
Hexanal—30.0 g. (0.33 mole)

The crude oily product was obtained in quantitative yield.

*Example 16.—γ-pyridyl heptenyl sulfone*

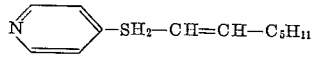

The procedure is the same as in Example 1 using the following reactants:

Sodium hydride—15 g. of 53.5% dispersion
Phenyl phenyl[(γ - pyridylsulfonyl)methyl]phosphinate—124.0 g. (0.33 mole)
Hexanal—30.0 g. (0.33 mole)

The oily crude product was obtained in about 90% conversion.

*Example 17.—Ethyl 2-(4-pyridyl)vinyl sulfone*

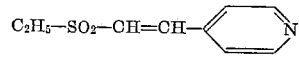

The sodium salt of diethyl ethylsulfonylmethylphosphonate was prepared from 73.3 g. (0.3 mole) of said phosphonate compound and 13.8 g. of 52% NaH in 600 ml. of toluene. Then 32.1 g. (0.3 mole) of freshly distilled pyridine 4-carboxaldehyde was added dropwise, keeping the temperature below 35° C. The mixture was heated to 60° C., and then the clear supernatant was removed by decantation. The solvent was removed. The residue was redissolved in toluene, heated with activated charcoal, filtered and the solvent removed to give 52.4 g. (88% conversion) of the off-white solid product. Recrystallization from ethyl ether-benzene gave fine white needles, M.P. 68.5–70° C.

Calculated for C$_9$H$_{11}$NO$_2$S: C, 54.82; H, 5.60; N, 7.09; S, 16.26. Found: C, 54.85; H, 5.84; N, 7.42; S, 16.07.

*Example 18.—Dodecyl 2-(2-furyl)vinyl sulfone*

11

The procedure is the same as in Example 1 using the following reactants:

Sodium hydride—15 g. of 53.5% dispersion
Diethyl dodecylsulfonylmethylphosphonate — 127.0 g. (0.33 mole)
Furfural—32.0 g. (0.33 mole)

After separation of the clear liquid phase the solvent was removed by vacuum distillation; the oily residue is the crude product obtained in quantitative yield.

*Example 19.—Butyl 2-(2-pyridyl)vinyl sulfone*

$$C_4H_9-SO_2-CH=CH-C_5H_4N$$

The procedure is the same as in Example 13 using the following reactants:

Sodium hydride—15 g. of 53.5% dispersion
Diethyl butylsulfonylmethylphosphonate—20.0 g. (0.33 mole)
Pyridine 2-carboxaldehyde—35.3 g. (0.33 mole)

The clear supernatant separated by decantation is evaporated in vacuo to obtain the crude product as an oily residue in quantitative yield.

When sodium ethylate was substituted for the sodium hydride essentially the same results were obtained.

*Example 20.—Polymer from 1,2-bis(diethoxyphosphinylmethylsulfonyl)ethane and succinaldehyde*

The procedure is the same as in Example 1 using the following solvent and reactants:

Bis(2-ethoxylthyl)ether—200 cc.
Sodium hydride—15 g. of 53.5% dispersion
1,2-bis(diethoxyphosphinylmethylsulfonyl)ethane—130 g. (0.33 mole)
Succinaldehyde—28.5 g. (0.33 mole)

After the addition of the aldehyde was completed the reaction mixture was kept at 30° for 12 hrs. and worked up to obtain the crude product as a viscous oil which can be hydrogenated to an essentially saturated polymeric product.

It will be understood that numerous changes and variations may be made from the above description and examples without departing from the spirit and scope of the invention.

We claim:

1. A process for the preparation of α,β-unsaturated sulfones which comprises the preparation in an inert organic solvent and at a temperature between about —10° and about 30° C. of a sulfonylmethylphosphinyl carbanion and thereafter contacting said anion with an essentially stoichiometric amount of a carbonyl compound selected from the group consisting of aldehydes and ketones.

2. A process for the preparation of α,β-unsaturated sulfones which comprises reacting a base stronger than sodium hydroxide at a temperature between about —10° and about 30° C. and in an inert organic solvent, with a sulfonylmethylphosphonate having the formula $$R_1-SO_2-CH_2-\overset{O}{\underset{\|}{P}}(OR_2)_2$$

where $R_1$ is hydrocarbon selected from the class consisting of alkyl and aryl containing up to eighteen carbon atoms and $R_2$ is lower alkyl to form a sulfonylmethylphosphonate carbanion, and thereafter contacting said anion with a stoichiometric amount of a carbonyl compound of the formula $$R_3-\overset{O}{\underset{\|}{C}}-R_4$$

where $R_3$ is a member selected from the group consisting of hydrogen, alkyl and aryl and $R_4$ is selected from the group consisting of alkyl, aryl and heterocyclic, each of said $R_3$ and $R_4$ containing up to eighteen carbon atoms.

3. The process of claim 2 wherein the base is an alkali metal ethylate.

12

4. The process of claim 2 wherein the base is an alkali metal hydride.

5. A process for the preparation of α,β-unsaturated sulones which comprises contacting in an inert organic solvent at a temperature between about —10° C. and about 30° C. sodium hydride with a sulfonylmethylphosphonate having the formula $$R_1-SO_2-CH_2-\overset{O}{\underset{\|}{P}}-(OR_2)_2$$

where $R_1$ and $R_2$ are alkyl groups containing from one to four carbon atoms to form a sulfonylmethylphosphonate carbanion and thereafter contacting said anion with an essentially stoichiometric amount of an aldehyde.

6. A process for the preparation of α,β-unsaturated sulfones which comprises contacting in an inert organic solvent at a temperature between about —10° C. and about 30° C. sodium hydride with a sulfonylmethylphosphonate having the formula $$R_1-SO_2-CH_2-\overset{O}{\underset{\|}{P}}-(OR_2)_2$$

where $R_1$ and $R_2$ are alkyl groups containing from one to four carbon atoms to form a sulfonylmethylphosphonate carbanion and thereafter contacting said anion with an essentially stoichiometric amount of a ketone.

7. The process of claim 6 wherein the ketone is acetone.

8. The process of claim 6 wherein the ketone is cyclohexanone.

9. A process for the preparation of α,β-unsaturated sulfones which comprises reacting a base stronger than sodium hydroxide at a temperature between about —10° and about 30°C. and in an inert organic solvent, with a sulfonylmethylphosphine oxide having the formula $$R_1-SO_2-CH_2-\overset{O}{\underset{\|}{P}}(R_2)_2$$

where $R_1$ is hydrocarbon selected from the class consisting of alkyl and aryl containing up to eighteen carbon atoms and $R_2$ is selected from the group consisting of alkyl and aryl having up to six carbon atoms, to form a sulfonyl methyl phosphinyl carbanion, and thereafter contacting said anion with an essentially stoichiometric amount of a carbonyl compound of the formula $$R_3-\overset{O}{\underset{\|}{C}}-R_4$$

where $R_3$ is a member selected from the group consisting of hydrogen, alkyl and aryl and $R_4$ is selected from the group consisting of alkyl, aryl and heterocyclic, each of said $R_3$ and $R_4$ containing up to eighteen carbon atoms.

10. The process of claim 9 wherein the base is an alkali metal ethylate.

11. A process for the preparation of α,β-unsaturated sulfones which comprises reacting a base stronger than sodium hydroxide at a temperature between about —10° and about 30° C. and in an inert organic solvent, with a sulfonylmethylphosphinyl compound having the formula $$R_1-SO_2-CH_2-\overset{O}{\underset{\|}{P}}\diagup^{R_2}_{OR_2}$$

where $R_1$ is hydrocarbon selected from the class consisting of alkyl and aryl containing up to eighteen carbon atoms and $R_2$ is selected from the group consisting of alkyl and aryl having up to six carbon atoms to form a sulfonylmethylphosphinyl carbanion, and thereafter contacting said anion with a carbonyl compound of the formula $$R_3-\overset{O}{\underset{\|}{C}}-R_4$$

where $R_3$ is a member selected from the group consisting of hydrogen, alkyl and aryl and $R_4$ is selected from the group consisting af alkyl, aryl and heterocyclic, each of said $R_3$ and $R_4$ containing up to eighteen carbon atoms.

12. The process of claim 11 wherein the base is an alkali metal ethylene.

13. The process of claim 11 wherein the base is an alkali metal hydride.

References Cited

UNITED STATES PATENTS 3,106,585  10/1963  Szabo _____ 260—607
3,219,708  11/1965  Welch _____ 260—607

OTHER REFERENCES

Greenwald et al.: J. Org. Chem., vol. 28, p. 1128–9 (1963).

Corey et al.: J. Am. Chem. Soc., vol. 84, p. 866–7 (1962).

ALEX MAZEL, *Primary Examiner.*

D. DAUS, *Assistant Examiner.*